United States Patent [19]
Allison

[11] 3,941,401
[45] Mar. 2, 1976

[54] INDEPENDENT WHEEL SUSPENSION HAVING SUSPENSION STRUT

[75] Inventor: William D. Allison, Grosse Pointe Farms, Mich.

[73] Assignee: Ford Motor Company, Dearborn, Mich.

[22] Filed: Dec. 23, 1974

[21] Appl. No.: 535,539

[52] U.S. Cl. .................... 280/96.2 B; 280/124 A
[51] Int. Cl.² ........................................ B62D 17/00
[58] Field of Search ...... 280/96.2 R, 96.2 B, 124 R, 280/124 A, 124 B

[56] References Cited
UNITED STATES PATENTS

| 2,967,066 | 1/1961 | Nueller | 280/124 |
| 3,237,962 | 3/1966 | Kraus | 280/96.2 B |

Primary Examiner—Philip Goodman
Attorney, Agent, or Firm—Clifford L. Sadler; Keith L. Zerschling

[57] ABSTRACT

An independent wheel suspension for a motor vehicle according to the present disclosure includes a wheel support member that rotatably supports a road wheel, a laterally extending suspension arm connecting the support member to vehicle body structure and a vertically extending telescopic suspension strut which has its upper end connected to the body structure and its lower end connected to the wheel support member. An elastomeric sleeve surrounds the lower end of the strut and is enclosed by a C-shape clamp that secures the strut to the wheel support member. The elastomeric sleeve permits limited relative movement between the wheel support member and the strut whereby wheel vibrations and noise are isolated from the suspension strut and the vehicle body.

11 Claims, 3 Drawing Figures

U.S. Patent  March 2, 1976  3,941,401
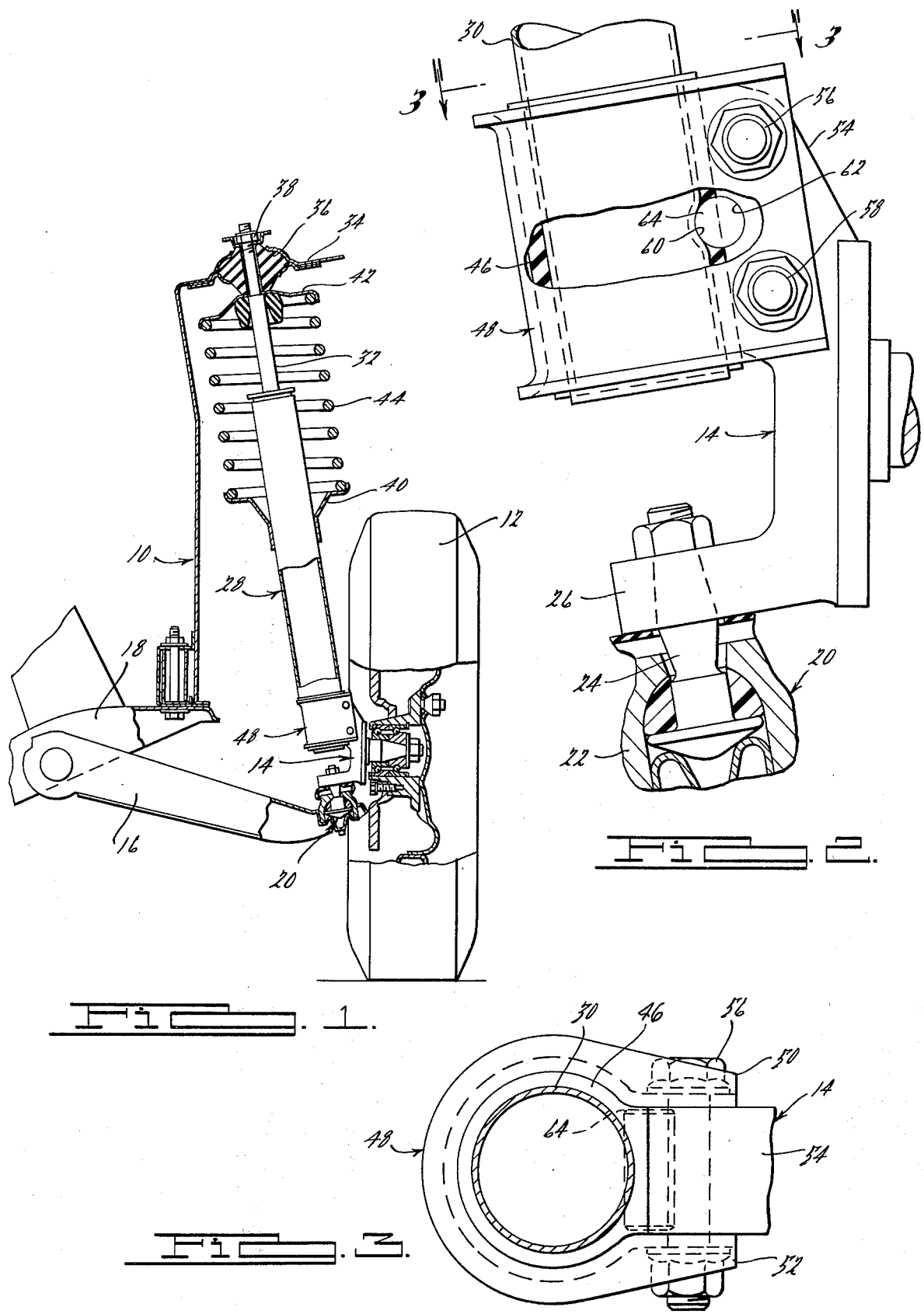

INDEPENDENT WHEEL SUSPENSION HAVING SUSPENSION STRUT

BACKGROUND AND SUMMARY OF THE DISCLOSURE

The present disclosure is related to independent wheel suspensions for motor vehicles, and more particularly to suspensions having telescopic suspension struts. Typical of suspension of this general type is the one disclosed in U.S. Pat. No. 2,624,592 to Earl S. MacPherson. The present disclosure describes an improvement in such suspensions and is directed to reducing the transmission of wheel vibrations and road noises from the wheel support member through the suspension strut to the vehicle body.

BRIEF SUMMARY OF THE DISCLOSURE

According to the presently preferred embodiment of this invention, an independent wheel suspension for a motor vehicle includes a wheel support member or spindle that is constructed to rotatably support a vehicle road wheel. A laterally extending suspension arm has its inner end pivotally connected to vehicle body structure and its outer end connected to the wheel support member by a ball joint. A vertically extending suspension strut has its upper end connected to the vehicle body and its lower end connected to the wheel support member by a unique structure.

The suspension strut has a generally tubular construction at its lower end which is surrounded by an elastomeric sleeve. A clamp of generally C-shape construction surrounds the elastomeric sleeve and is secured to the wheel support member. A pin is interposed between the clamp and the strut to limit relative movement between these members.

The elastomeric sleeve attenuates the transmission of road noises from the wheel support member through the strut to the vehicle body. In addition, it permits slight movement of the wheel support member independently of the strut whereby vibration of the wheel support member induced by an imbalance of the wheel will cause the wheel support to oscillate independently of the strut and such vibrations will not be transmitted to the vehicle body.

BRIEF DESCRIPTION OF THE DRAWING

The many objects and advantages of a motor vehicle suspension system constructed in accordance with this invention will become apparent upon consideration of the following detailed description and the accompanying drawings, in which:

FIG. 1 is a front elevational view of an independent front wheel suspension for a motor vehicle incorporating a preferred form of this invention.

FIG. 2 is an enlarged elevational view, partly in section, of the wheel support member and its connection with the lower suspension arm and the suspension strut.

FIG. 3 is a sectional view taken along section line 3—3 of FIG. 2.

DETAILED DESCRIPTION OF THE PREFERRED EMBODIMENT

Referring now to the drawings, where the presently preferred embodiment of this invention is illustrated, FIG. 1 discloses an independently front wheel suspension for a motor vehicle that includes vehicle body structure 10, a road wheel 12 and unique suspension means supporting the body 10 upon the wheel 12.

The wheel 12 is rotatably supported upon a wheel spindle or wheel support member 14 by conventional wheel bearings. A laterally extending suspension arm 16 has its inner end pivotally connected to a frame component 18 of the vehicle body structure 10. A ball joint assembly 20 pivotally connects the outer end of the suspension arm 16 to the wheel support 14. The ball joint assembly 20 has a socket portion 22 that is affixed to the arms 16 and a ball stud 24 which is secured to an eye formed in an inwardly extending portion 26 of the wheel support member 14.

A telescopic suspension strut 28 is interposed between the vehicle body structure 10 and the wheel support member 14. The strut 28 includes an outer tubular portion 30 and an inner piston and piston rod assembly 32 that is constructed to reciprocate within the tube 30. The upper end of the piston rod 32 is secured to a sheet metal portion 34 of the body structure 10 by means of a rubber element 36 and a nut 38.

A lower spring seat 40 is welded to the outside of the tube 30. An upper spring seat 42 is secured to the piston rod 32. A coil type suspension spring 44 is interposed between the lower and upper spring seats 40 and 42 for the purpose of resiliently supporting the mass of the vehicle body upon the wheel support member 14 and wheel 12.

The lower end of the tube 30 is surrounded by a rubber sleeve 46. The sleeve 46, in turn, is surrounded by a generally C-shape clamp 48. The clamp 48 has laterally extending flange portions 50 and 52 that are positioned on either side of an upstanding portion 54 of the wheel support member 14. Upper and lower bolts 56 and 58 secure the flanges 50 and 52 of the clamp 48 to the wheel support portion 54.

In order to align the position of the wheel support member 14 with respect to the strut, the lower end of the tube 30 is provided with a transverse groove 60. Similarly, the upstanding wheel support portion 54 is formed with a transverse groove 62 juxtaposed the groove 60. An aligning pin 64 is positioned between the groove 60 and 62. The ends of the pin 64 are contained between the flanges 50 and 52 of the C-shape clamp 48.

OPERATION

The body structure 10 is resiliently supported on the wheel 12 by the spring 44. The strut 28 is telescopic and cooperates with the suspension arm 16 to define a vertical jounce and rebound path for the wheel. The strut 28 contains hydraulic shock absorber components and is constructed to dampen such vertical movement.

The wheel 12 is steerable. The wheel support 14 is free to be angularly displaced about an axis extending through the strut 28 and the ball joint 20 when a force is transmitted thereto by the vehicle's steering linkage system (not shown). During a steering maneuver, the tube 30 of the strut 28 is turned with respect to the piston rod 32.

When the road wheel 12 traverses road irregularities, noise and vibration will be transmitted to the wheel support member 14. In order to attenuate the transmission of the noise and vibration to the vehicle body 10, the rubber sleeve 46 is interposed between the wheel support member and the strut 28. The elastomeric material of the sleeve 46 functions as a dampening medium with respect to such disturbances.

In addition, this suspension construction permits the wheel support member 14 to move or oscillate to a limited extent with respect to the strut and such permitted movement reduces a phenomena known as steering wheel nibble. Nibble is the angular osicllation of the steering wheel at the rate of one oscillation per revolution of the front wheel. It is a resonant vibration and appears in some vehicles in the 40 to 50 per hour range. Nibble results mainly from out-of-balance of one or both of the vehicle's front wheels. The amount of nibble in a particular car appears to be proportional to some extent to the rigidity with which the wheel spindle axis is restrained in a vertical plane. The present suspension provides a resilient vertical restraint for the wheel support 14 and its spindle axis.

A balanced wheel will rotate about the spindle axis without vibration. Unbalancing the wheel results in a shift of location of the rotating axis of the mass. When the unbalanced wheel is forced to rotate about the spindle axis, high forces are applied to the spindle which tend to deflect it into a cone-shape orbit. Vertical deflection of this orbit is normally resisted by the suspension linkage. It is probable that restricting the vertical amplitude of movement of the spindle amplifies its longitudinal excursion. The longitudinal component of the forces on the wheel spindle is transmitted into the steering tie rods and to the steering wheel.

In the present suspension, the wheel support member 14 may be displaced vertically with respect to the tube 30 of the strut 28 due to the resiliency of the rubber sleeve 46. This reduction in the restraint of wheel support movement in the vertical plane will result in a corresponding reduction of wheel support member movement in a horizontal plane. The reduction in horizontal movement, in turn, will result in a reduction of steering wheel nibble.

The foregoing description presents the presently preferred embodiment of this invention. Details of construction have been disclosed for purposes of illustration rather than limitation. Modifications and alterations of the invention may occur to those skilled in the art that will come within the scope and spirit of the following claims.

I claim:

1. An independent wheel suspension for a motor vehicle comprising vehicle body structure, a wheel support member, and suspension means interconnecting said body structure and said wheel support member, said suspension means including an extensible suspension strut having one end connected to said body structure, connecting means connecting the other end of said strut to said wheel support member, the camber and caster alignment of said wheel support member being determined in part by said strut, said connecting means including an elastomeric member operatively interposed between said wheel support member and said strut, said elastomeric member being constructed to attenuate the transmission of vibrations from said wheel support member to said strut.

2. An independent wheel suspension according to claim 1 and including:

said suspension means including a spring connected to said strut and constructed to support a portion of the mass of said body structure on said strut.

3. An independent wheel suspension according to claim 1 and including:

means interposed between said wheel support member and said strut constructed to limit angular movement of said wheel support member relative to said strut about a substantially vertical steering axis.

4. An independent wheel suspension for a motor vehicle comprising vehicle body structure, a steerable wheel support member and suspension means interconnecting said body structure and said wheel support member, said suspension means including an extensible suspension strut having one end connected to said body structure, connecting means connecting the other end of said strut to said wheel support member, the camber and caster alignment of said wheel support member being determined in part by said strut, said connecting means including an elastomeric sleeve surrounding said strut and operatively interposed between said wheel support member and said strut, said elastomeric sleeve being constructed to attenuate the transmission of vibrations from said wheel support member to said strut.

5. An independent wheel suspension according to claim 4 and including:

said suspension means including a spring connected to said strut and constructed to support a portion of the mass of said body structure on said strut.

6. An independent wheel suspension according to claim 4 and including:

means interposed between said wheel support member and said strut constructed to limit relative movement between said wheel support member and said strut.

7. An independent wheel suspension system according to claim 4 and including:

a coil type suspension spring surrounding said strut and having one end secured to said strut, said suspension spring being constructed to resiliently support the mass of said body structure on said strut, means interposed between said strut and said wheel support member constructed to limit the relative movement between said wheel support member and said strut.

8. An independent wheel suspension for a motor vehicle comprising:

a wheel support member constructed to rotatably support a vehicle road wheel, an extensible suspension strut having first and second telescopically related strut components, said first strut component being constructed to be connected to a vehicle body structure, said second strut component including a generally tubular member, an elastomeric sleeve surrounding a portion of said tubular member, clamping means positioned about said elastomeric sleeve and secured to said wheel support member, said elastomeric sleeve being constructed to accommodate limited displacement of said clamping means with respect to said tubular member.

9. An independent wheel suspension for a motor vehicle comprising:

a wheel support member constructed to rotatably support a vehicle road wheel, an extensible suspension strut being first and second telescopically related strut components, said first strut component being constructed to be connected to a vehicle body structure, said second strut component including a generally tubular member, an elastomeric sleeve surrounding a portion of said tubular member, clamping means positioned about said elastomeric sleeve and secured to said wheel support member, said elastomeric sleeve being constructed to accommodate limited displacement of said clamping means with respect to said tubular member, a coil spring surrounding said strut and having one end secured to said second strut component, said coil spring being constructed to resiliently support a portion of the weight of a motor vehicle body on said second strut component.

10. An independent suspension system for a motor vehicle comprising vehicle body structure, a steerable wheel support member and suspension means interconnecting said body structure and said wheel support member, said suspension means including a generally laterally extending suspension arm having its inner end pivotally connected to said vehicle body structure, a ball joint connecting the outer end of said arm to said wheel support member, an extensible suspension strut having first and second telescopically related strut components, said first strut component being connected to said vehicle body structure, said second strut component including a generally tubular member, connecting means connecting said tubular member to said wheel support member, a coil spring surrounding said strut, means operatively connecting the upper and lower ends of said spring to said first and said second strut components, respectively, said connecting means including an elastomeric sleeve surrounding a portion of said tubular member, clamping means positioned about said elastomeric sleeve and secured to said wheel support member, pin means interposed between said tubular member and said wheel support member constructed to limit relative movement between said clamping means and said tubular means, said connecting means being constructed to accommodate limited movement of said wheel support member relative to said tubular member.

11. An independent wheel suspension for a motor vehicle comprising vehicle body structure, a steerable wheel support member and suspension means interconnecting said body structure and said wheel support member, said suspension means including an extensible suspension strut having one end connected to said body structure and an elongated body coaxial with the steering axis of said wheel support member, connecting means connecting the other end of said strut to said wheel support member, the caster and camber alignment of said wheel support member being determined in part by said strut, said connecting means including an elastomeric sleeve surrounding said strut and operatively interposed between said wheel support member and said strut, said elastomeric sleeve being constructed to attenuate the transmission of vibrations from said wheel support member to said strut, the longitudinal axis of said sleeve being coaxial with the steering axis of said wheel support member.

* * * * *